US008027743B1

(12) United States Patent
Johnston

(10) Patent No.: US 8,027,743 B1
(45) Date of Patent: Sep. 27, 2011

(54) ADAPTIVE NOISE REDUCTION

(75) Inventor: David E. Johnston, Duvall, WA (US)

(73) Assignee: Adobe Systems Incorporated, San Jose, CA (US)

( * ) Notice: Subject to any disclaimer, the term of this patent is extended or adjusted under 35 U.S.C. 154(b) by 1008 days.

(21) Appl. No.: 11/877,630

(22) Filed: Oct. 23, 2007

(51) Int. Cl.
*G06F 17/00* (2006.01)

(52) U.S. Cl. .......................................................... 700/94

(58) Field of Classification Search .................... 700/94; 381/94.3, 98–109
See application file for complete search history.

(56) References Cited

U.S. PATENT DOCUMENTS 7,613,529 B1 * 11/2009 Williams ........................ 700/94
2008/0192956 A1 * 8/2008 Kazama ........................ 381/94.3
* cited by examiner

*Primary Examiner* — Andrew C Flanders
(74) *Attorney, Agent, or Firm* — Fish & Richardson P.C.

(57) ABSTRACT

Systems and methods for editing digital audio data are provided. In one implementation, a method is provided that includes receiving digital audio data. Input is received selecting a noise threshold identifying a level at which one or more segments of audio data are considered to be noise. The noise threshold is associated with a plurality of parameters of the audio data and applicable to a plurality of frequency bands of the audio data. A first segment and second segment of the digital audio data are analyzed at a selected frequency band to identify noise. When the audio data in the first segment exceeds the noise threshold, the first segment is identified as including a first noise and the audio data is compressed. When audio data in the second segment exceeds the noise threshold, the second segment is identified as including a second noise and the audio data is compressed.

21 Claims, 10 Drawing Sheets

1000

ADAPTIVE NOISE REDUCTION

BACKGROUND

The present disclosure relates to editing digital audio data.

Different visual representations of audio data are commonly used to display different features of the audio data. For example, an amplitude display shows a representation of audio intensity in the time-domain (e.g., a graphical display with time on the x-axis and intensity on the y-axis). Similarly, a frequency spectrogram shows a representation of frequencies of the audio data in the time-domain (e.g., a graphical display with time on the x-axis and frequency on the y-axis).

Audio data can be edited. For example, the audio data may include noise or other unwanted components. Removing these unwanted components improves audio quality (i.e., the removal of noise components provides a clearer audio signal). Alternatively, a user may apply different processing operations to portions of the audio data to generate particular audio effects.

The application of compression is one way of removing or reducing noise from audio data. A compression amount is initially specified (e.g., compress 20 dB for all amplitudes over −12 dB), and corresponding audio data is compressed (i.e., the amplitude is attenuated) by that compression amount.

SUMMARY

In general, in one aspect, a computer-implemented method is provided. The computer-implemented method includes receiving digital audio data. A user input is received selecting a noise threshold identifying a level at which one or more segments of audio data are considered to be noise. The noise threshold is associated with a plurality of parameters of the audio data including an amplitude value of the audio data and a corresponding duration of the audio data, and the noise threshold can be applied to a plurality of frequency bands of the audio data.

A first segment of the digital audio data is analyzed at a selected frequency band to identify noise. When the audio data in the first segment exceeds the noise threshold, the first segment is identified as including a first noise and the audio data is compressed. Analysis of the first segment includes determining a first amplitude of the audio data corresponding to the first noise and attenuating audio data of the selected frequency band according to the first amplitude of the first noise.

A second segment of the digital audio data is analyzed at the selected frequency band to identify noise. When audio data in the second segment exceeds the noise threshold, the second segment is identified as including a second noise and the audio data is compressed. Analysis of the second segment includes determining a second amplitude of the audio data corresponding to the second noise and attenuating audio data of the selected frequency band of the second segment according to second amplitude of the second noise. Additionally, the second amplitude is distinct from the first amplitude such that the compression is adapted to compress the second noise at the second amplitude.

Other embodiments of this aspect include corresponding systems, apparatus, and computer program products.

These and other embodiments can optionally include one or more of the following features. Compressing the first noise can include determining a compression amount to be applied to the audio data corresponding to the first noise and adjusting a compression threshold to correspond to the amplitude of the first noise. Additionally, compressing the second noise can include adjusting the compression threshold to correspond to the amplitude of the second noise. The noise threshold can indicate a confidence that particular audio data is noise, and the noise threshold can be a function of the parameters of the audio data in each segment. One or more segments of digital audio data can overlap in time. Analyzing the segments of audio data can further include recording and determining one or more patterns in the threshold history for the amount of time. The compression of the amplitude can be automatic.

Particular embodiments of the subject matter described in this specification can be implemented to realize one or more of the following advantages. Adjustments to the compression amount are not automatic, are applied to the entire audio data in the same way, and do not account for the frequently changing nature of audio data, for example, what a listener might consider to be noise within the audio data can change as the audio data changes. Different changes in audio data can be recognized and edited at particular frequency bands. For example, a threshold initially set to identify noise at a particular frequency band can adapt to identify changes to the amplitude and phase for that particular frequency over a distinct period of time.

Identified changes to the audio data can be studied (e.g., using the isolated frequency band data or a graphical analysis of all frequency data) to determine whether the changes are desirable audio data (e.g., a held note or tone the user wants to keep), undesirable audio data (e.g., noise), or a combination of both desirable and undesirable audio data. The adaptive identification and removal of noise throughout a segment of audio data allows for the more careful and accurate removal of undesirable audio data while maintaining desirable audio data. A current noise floor can be determined for purposes of noise removal, even if that noise floor changes over time. Thus, in addition to being capable of removing noises that are constant in nature (e.g., constant tones), noises that are not constant in nature (e.g., airplanes, cars, interior car noise, and any background noise) can also be removed.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
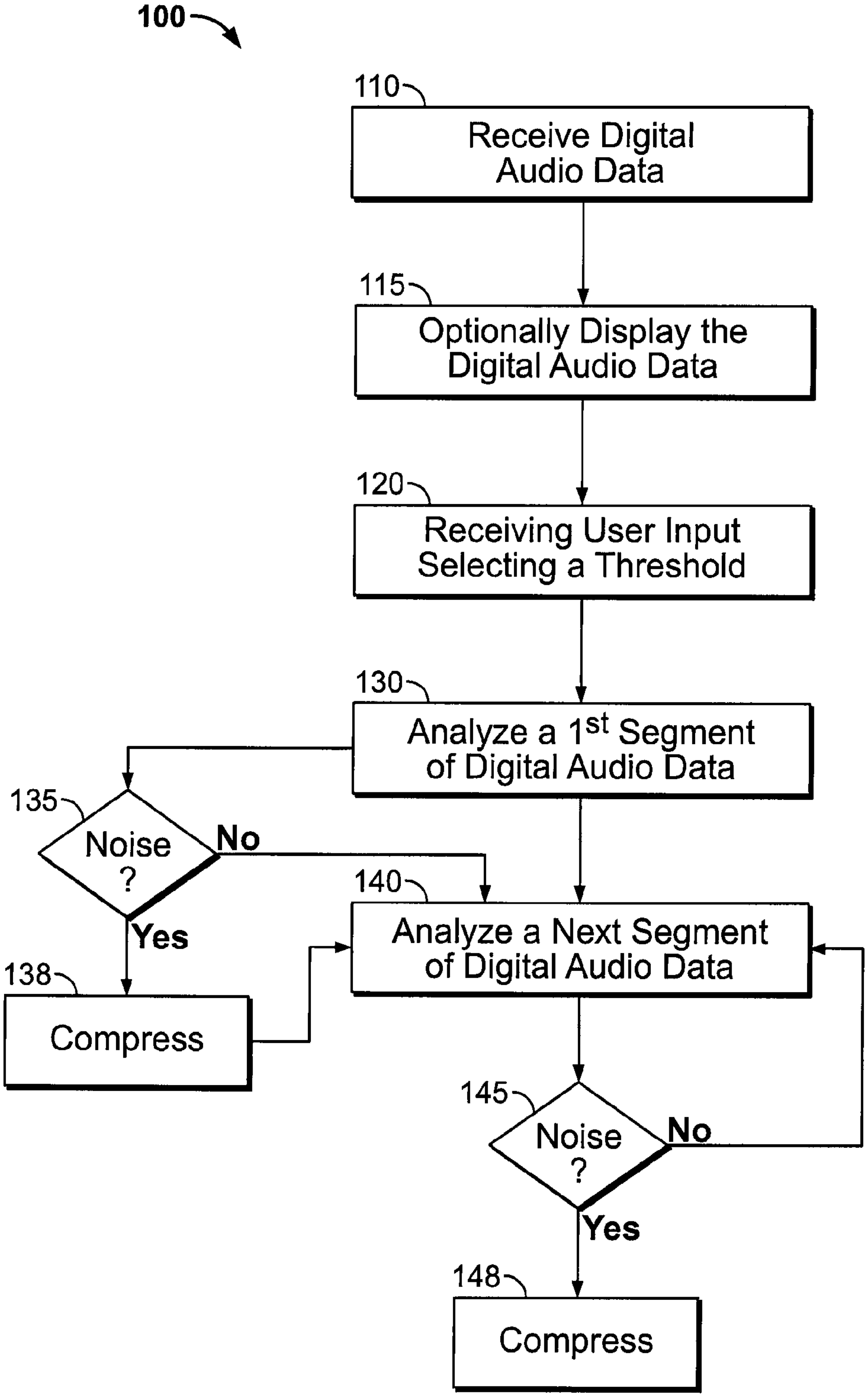
FIG. 1 shows a flowchart of an example method for editing digital audio data.

FIG. 1 shows a flowchart of an example method 100 for editing digital audio data. For convenience, the method 100 will be described with reference to a system that performs the method 100. The system receives 110 audio data. The audio data can be received in response to a user input to the system selecting particular audio data to edit. The audio data can also be received for other purposes (e.g., for review by the user). In some implementations, the system receives the audio data from a storage device local or remote to the system.

In some implementations, the system displays 115 a representation of the audio data (e.g., as frequency spectrogram). For example, a particular feature of the audio data can be plotted and displayed in a window of a graphical user interface. The visual representation can be selected to show a number of different features of the audio data. In some implementations, the visual representation displays a feature of the audio data on a feature axis and time on a time axis. For example, visual representations can include a frequency spectrogram, an amplitude waveform, a pan position display, or a phase display.

In some implementations, the visual representation is a frequency spectrogram. The frequency spectrogram shows audio frequency in the time-domain (e.g., a graphical display with time on the x-axis and frequency on the y-axis). Additionally, the frequency spectrogram can show intensity of the audio data for particular frequencies and times using, for example, color or brightness variations in the displayed audio data. In some alternative implementations, the color or brightness are used to indicate another feature of the audio data e.g., pan position. In another implementation, the visual representation is an amplitude waveform. The amplitude waveform shows audio intensity in the time-domain (e.g., a graphical display with time on the x-axis and intensity on the y-axis).

In other implementations, the visual representation is a pan position or phase display. The pan position display shows audio pan position (i.e., left and right spatial position) in the time domain (e.g., a graphical display with time on the x-axis and pan position on the y-axis). The phase display shows the phase of audio data at a given time. Additionally, the pan position or phase display can indicate another audio feature (e.g., using color or brightness) including intensity and frequency.

Figure 2:
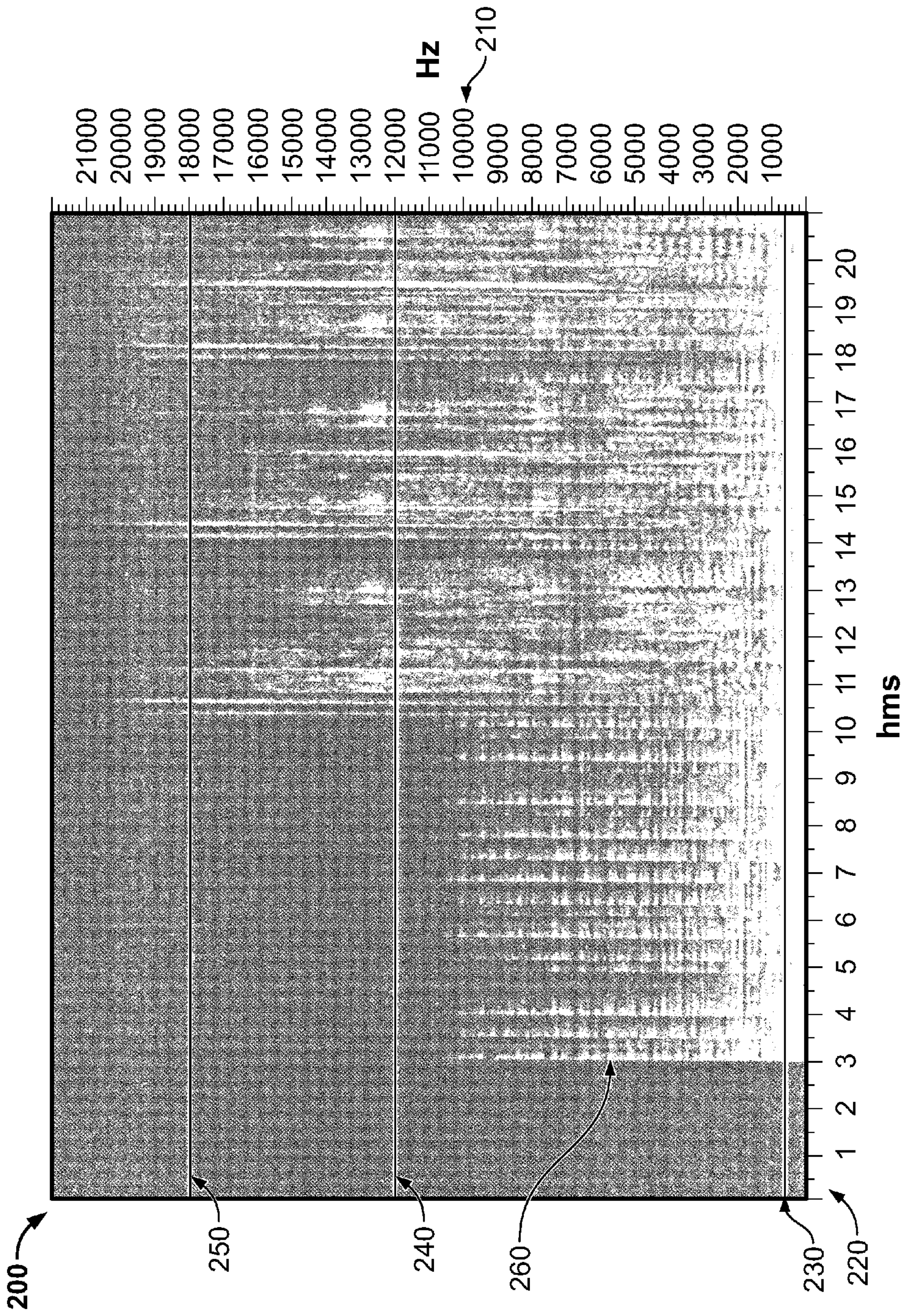
FIG. 2 shows an example frequency spectrogram display of audio data.

FIG. 2 shows an example frequency spectrogram 200 display of audio data. While the editing method and associated example figures described below show the editing of audio data with respect to a frequency spectrogram representation of the audio data, the method is applicable to other visual representations of the audio data, for example, an amplitude display. In one implementation, the user selects the type of visual representation for displaying the audio data.

The frequency spectrogram 200 shows the frequency components of the audio data 260 in a frequency-time domain. Thus, the frequency spectrogram 200 identifies individual frequency components within the audio data at particular points in time. In the frequency spectrogram 200, the y-axis 210 displays frequency in hertz. In the y-axis 210, frequency is shown having a range from zero to greater than 21,000 Hz. However, frequency data can alternatively be displayed with logarithmic or other scales as well as other frequency ranges. Time is displayed on the x-axis 220 in seconds.

In some implementations of the user interface, the user zooms in or out of either axis of the displayed frequency spectrogram independently such that the user can identify particular frequencies over a particular time range. The user zooms in or out of each axis to modify the scale of the axis and therefore increasing or decreasing the range of values for the displayed audio data. The displayed audio data is changed to correspond to the selected frequency and time range. For example, a user can zoom in to display the audio data corresponding to a small frequency range of only a few hertz. Alternatively, the user can zoom out in order to display the entire audible frequency range.

Within the frequency spectrum 200, specific audio content (e.g., noise, music, reoccurring sounds or prolonged tones) can be identified according to frequency (e.g., within a particular frequency band). For example, the frequency components of the audio data occurring at 840 Hz 230 include a signal with little to no music for the first three seconds, followed by regular music. Additionally, the frequency spectrogram 200 shows that the frequency components of the audio data occurring at 12 kHz 240 include a tone (e.g., audio having a constant frequency) over a certain time period (e.g., for the first 10.5 seconds), followed by a tone and music for another two seconds, followed by semi-sparse music (e.g., non-continuous music) for the next 7 seconds. As another example, the frequency components of the audio data 250 occurring at 18 kHz includes background noise for about 10.5 seconds followed by a few musical bursts during the next 10.5 seconds.

As shown in FIG. 1, the system receives 120 user input selecting a value for a noise threshold (e.g., a "noisiness" value). In some implementations, the system provides a noise threshold value that is suggested to the user. In other implementations, the system specifies the noise threshold value automatically. The noise threshold value as initially set can derive a single noisiness value from the combination of one or more parameters. For example, the parameters can include the consideration of any combination of parameters such as an amount of amplitude, an amount of phase, a particular frequency, and an amount of time. In some implementations, the noise threshold value can be applied to multiple frequencies or frequency bands. The system identifies noise in the audio data according to the specified threshold value, as will be discussed in greater detail below.

Figure 3:
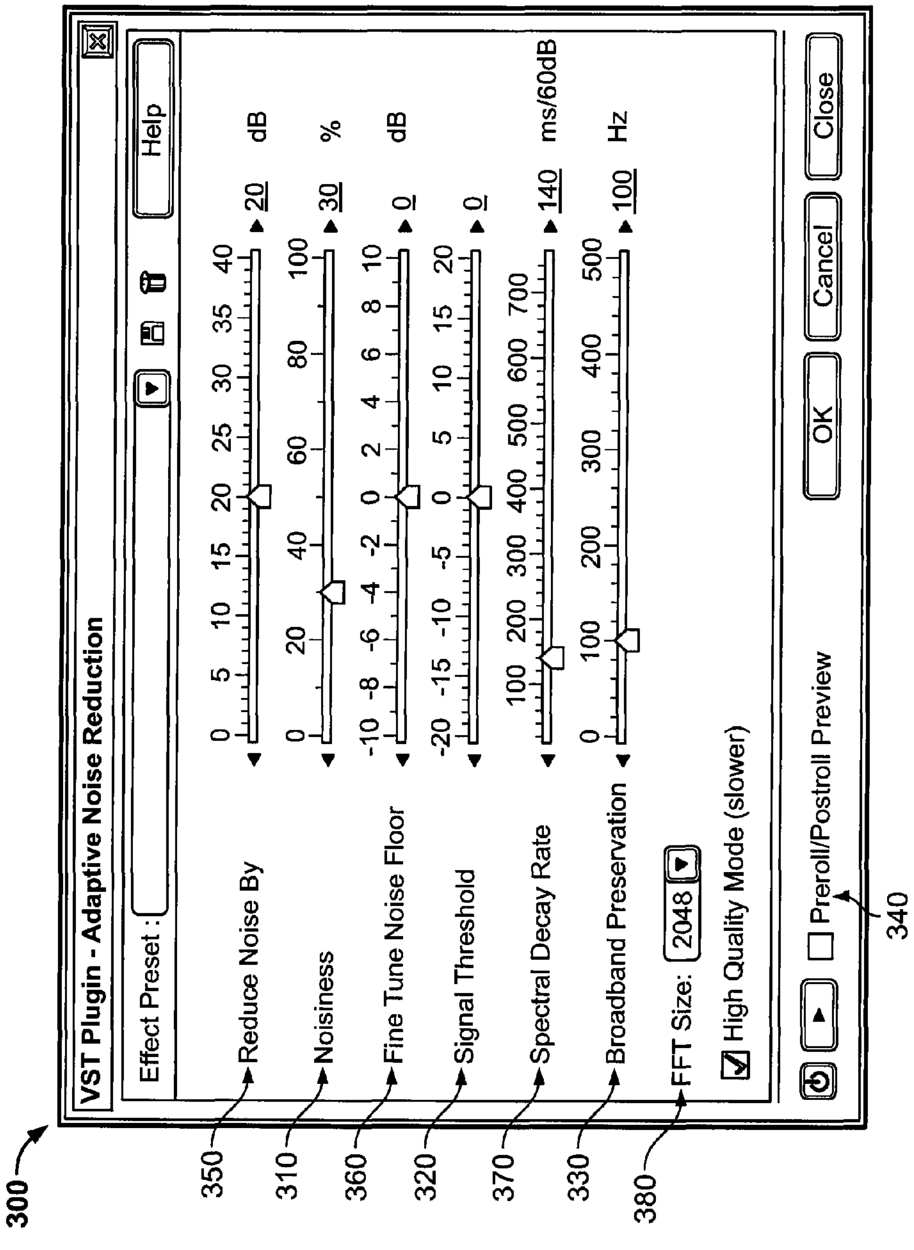
FIG. 3 shows an example user interface used to edit the audio data.

FIG. 3 shows an example user interface 300 used to edit the audio data. The user interface includes multiple controls that the user can use to provide input into the system. For example, the user interface 300 can include a noise threshold value 310 (e.g., "noisiness"). The user interface 300 can also include a control for selecting a value (e.g., the "signal threshold 320") to be compared with the output of the noisiness determination. For example, when the output of the noisiness determination is above the signal threshold value, the audio data is considered noise and is removed. Conversely, when the output of the noisiness determination is below the signal threshold value, the audio data is not considered noise and the audio data is preserved. In some implementations, the user can set different thresholds for different sound types.

In some implementations, a noisiness 310 and a signal threshold 320 amount correspond (e.g., map internally) to other parameters such as an adaptation length and a confidence level cutoff. An adaptation length setting allows longer lengths of audio data a greater amount of time to adapt, and thus a lesser amount of desirable audio data is actually removed. A confidence level cutoff is a setting (e.g., a threshold) against which the noisiness confidence of audio data is compared. In some implementations, if the audio data has a nosiness confidence above the confidence level cutoff, the audio data is considered noise. For example, a low confidence level can be assigned to desirable sounds that the user wants to keep (e.g., music and voice), and a high confidence level can be assigned to undesirable sounds that the user wants to disregard (e.g., noise, whines and hums). In some implementations, if the audio data has a noisiness confidence below the confidence level cutoff, the audio data is considered noise.

A broadband preservation 330 setting determines which areas of the audio signal will be edited (e.g., compressed). For example, the broadband preservation setting can indicate a band of audio data of a distinct range of frequencies that needs to be identified as noise before that audio data is removed.

A reduce noise by 350 setting limits the amount of signal reduction to an amount maximum. For example, if the reduce noise by 350 setting indicates that the system can reduce the audio data (e.g., a pure tone) by 20 dB, then the system attenuates the signal only 20 dB, regardless of whether or not the system can reduce the signal by a greater amount (e.g., 60 dB).

A spectral decay rate setting 370 determines a decay rate for reduction and removal of audio data determined to be noise. For example, instead of instantly reducing the amount of noise in the audio data, the spectral decay rate 370 setting indicates how the noise will be reduced by lower amounts in each segment (e.g., reducing at 0 dB in frame 5, then reducing to −30 dB in frame 6). In this way, the audio data takes N milliseconds (e.g., N being the spectral decay rate) to reduce off 60 dB.

A fine tune noise floor setting 360 adjusts the final noisiness output. The adjustment to the final noisiness output fine tunes the current noise floor (e.g., in decibels) up or down by a user specified amount. For example, when the system determines the existence of noise near the greatest amount of what can be identified as noise for a particular frequency (e.g., 1 kHz at a level −50 dB), the user may adjust the fine tune noise floor setting 360 to assume the noise is slightly louder so that the system removes more noise.

An FFT size setting 380 is the size of the fast Fourier Transform ("FFT") used by the system for all conversions from the time domain to the frequency domain and from the frequency domain back into the time domain. The FFT also effects time responsiveness, for example, smaller FFT sizes mean smaller frame sizes and a faster response to changing noise levels. On the other hand, lower FFT sizes can also mean less frequency accuracy, so pure tones may not be removed cleanly without removing neighboring frequencies. Thus, the FFT size setting 380 determines a balance between fast responsiveness and accurate frequency selection.

In some implementations, the audio editing system includes a preview function 340, which allows the user to preview the edited audio results prior to mixing edited audio data into the original audio data. In some implementations, the system also includes an undo operation allowing the user to undo performed audio edits, for example, audio edits that do not have the user intended results.

Figure 4:
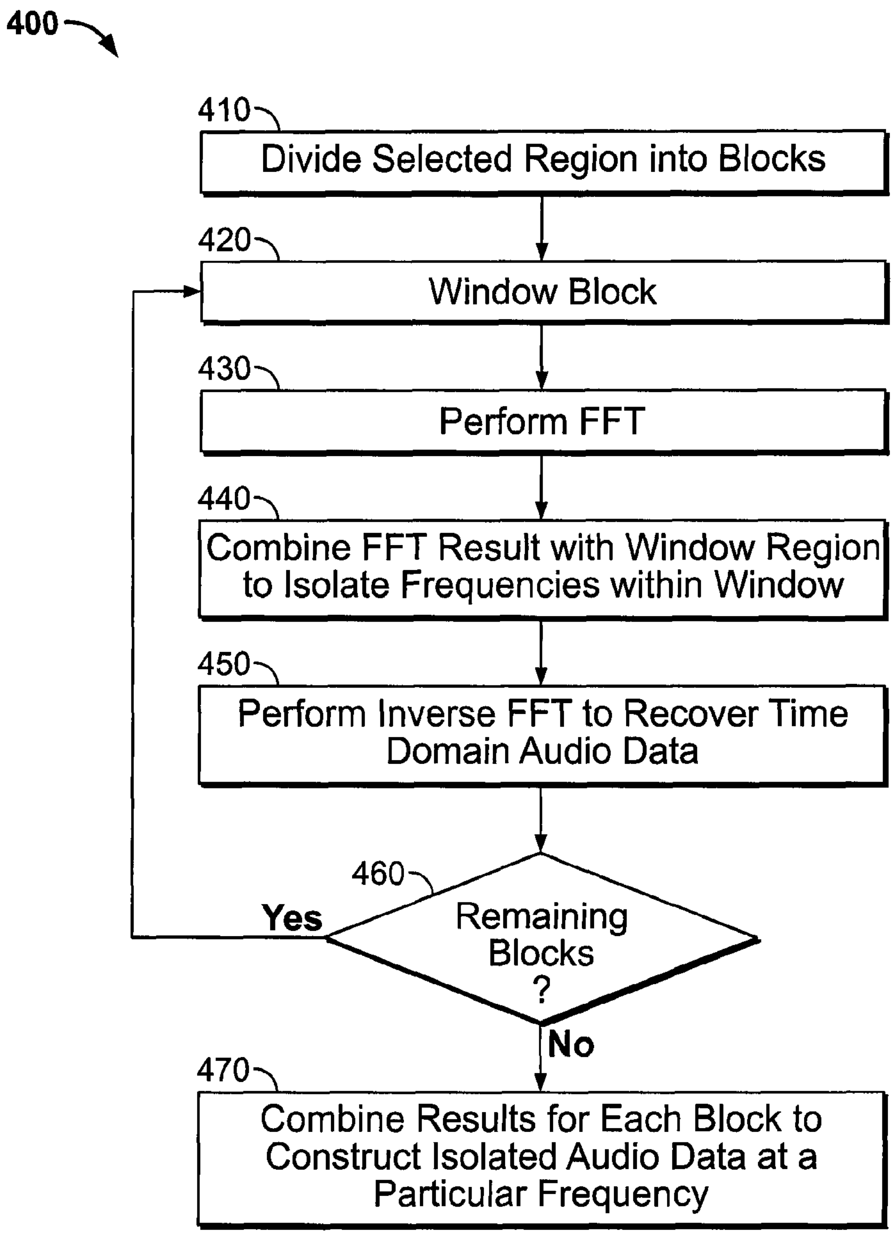
FIG. 4 shows a flowchart of an example process for separating audio data according to frequency.

As shown in FIG. 1, after the system receives 120 the user input selecting a noise threshold, the audio data is examined to determine which segments of the audio data contain noise by isolating portions of the audio data. FIG. 4 shows a flowchart of an example process 400 for separating audio data according to frequency. For convenience, the process 400 will be described with respect to a system that performs the process 400.

In order to determine which segments (e.g., portions) of the audio data contain noise, the system separates the audio data by frequency over time. To separate the audio data by frequency, the system divides 410 the audio data into a series of blocks. In some implementations, the blocks are rectangular units, each having a uniform width (block width) in units as a function of time. The amount of time covered by each block is selected according to the type of block processing performed. For example, when processing the block according to a Short Time Fourier Transform method, the block size is small (e.g., 10 ms). In some implementations, each successive block partially overlaps the previous block along the x-axis (i.e., in the time-domain). This is because the block processing using Fourier Transforms typically has a greater accuracy at the center of the block and less accuracy at the edges. Thus, by overlapping blocks, the method compensates for reduced accuracy at block edges.

Each block is then processed to isolate audio data within the block. For simplicity, the block processing steps are described below for a single block as a set of serial processing steps, however, multiple blocks can be processed substantially in parallel (e.g., a particular processing step can be performed on multiple blocks prior to the next processing step).

The system windows 420 each block. The window for a block is a particular window function defined for each block. A window function is a function that is zero valued outside of the region defined by the window (e.g., a Blackman-Harris window). Thus, by creating a window function for each block, subsequent operations on the block are limited to the region defined by the block. Therefore, the audio data within each block can isolated from the rest of the audio data using the window function.

The system performs a Fast Fourier Transform ("FFT"), (e.g., a 64-point FFT), on the audio data. In some implementations, the FFT is performed to identify amplitude data for multiple frequency bands of the audio data (e.g., as represented by frequency spectrogram 200).

The system performs 430 the FFT on the audio data to extract the frequency components of a vertical slice of the audio data over a time corresponding to the block width. The Fourier Transform separates the individual frequency components of the audio data from zero hertz to the Nyquist frequency. The system applies 440 the window function of the block to the FFT results. Because of the window function, frequency components outside of the block are zero valued. Thus, combining the FFT results with the window function removes any frequency components of the audio data that lie outside of the defined block.

The system performs 450 an inverse FFT on the extracted frequency components for the block to reconstruct the time domain audio data solely from within the block. However, since the frequency components external to the block were removed by the window function, the inverse FFT creates isolated time domain audio data results that correspond only to the audio components within the block.

The system similarly processes 460 additional blocks. Thus, a set of isolated audio component blocks are created. The system then combines 470 the inverse FFT results from each block to construct isolated audio data corresponding to the portion of the audio data at a particular frequency. The results are combined by overlapping the set of isolated audio component blocks in the time-domain. As discussed above, each block partially overlaps the adjacent blocks. In some implementations, to reduce unwanted noise components at the edges of each block, the set of isolated audio component blocks are first windowed to smooth the edges of each block. The windowed blocks are then overlapped to construct the isolated audio data.

In other implementations, audio data are isolated using other techniques. For example, instead of Fourier transforms, one or more dynamic zero phase filters can be used. A dynamic filter, in contrast to a static filter, changes the frequency pass band as a function of time, and therefore can be configured to have a pass band matching the particular frequencies present in a particular segment of audio data at each point in time.

Figure 8:
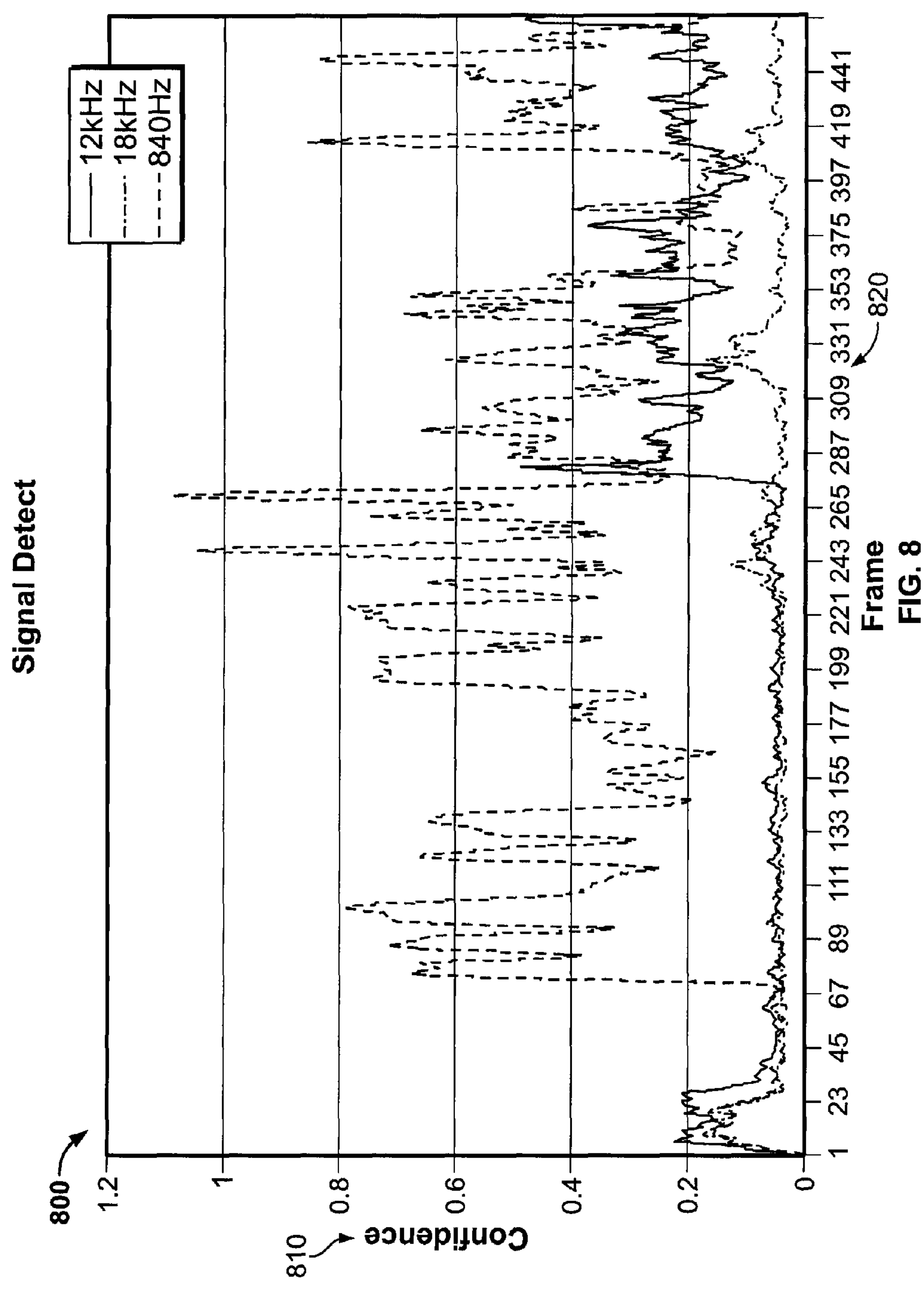
FIG. 8 shows an example graph corresponding to an analysis of the frequency spectrum display of the audio data in FIG. 2.

Once the audio data is isolated, the audio data can be further analyzed to determine if one or more segments of the audio data exceeds a minimum confidence level (e.g., a noise threshold). The minimum confidence level can be set manually (e.g., by the user) or automatically (e.g., by the system). Any frequency (e.g., 230, 240, or 250) that falls below that confidence level is considered noise and can be removed manually or automatically. For example, FIG. 8 shows an example graph 800, where a noise threshold of substantially 0.1 could be used to remove the noise at 840 Hz 230, the noise at 12 kHz 240, and the tone and intermittent noise at 18 KHz 250.

In some implementations, the amount of time audio data must lie below the set noise threshold before it is removed is specified (e.g., by the user or the system). For example, audio data lying below a set noise threshold for more than two seconds could be manually or automatically removed. In some implementations, the system suggests the removal of audio data to the user and the user can then manually remove the audio data.

In some implementations, the noise threshold (e.g., minimum confidence level) is set for the audio data occurring at a particular frequency band (e.g., frequency band 230 corresponding to audio data centered at 840 Hz). The system analyzes 130 a first segment of audio data to determine if a combination of parameters for the first segment of audio data at 840 Hz exceeds the noise threshold. For example, an analysis of the first segment can include an analysis of what change in amplitude occurs, what change in phase occurs, at what particular frequency these changes happen, and over what amount of time these changes happen. If the system determines that a combination of one or more parameters of the first segment exceeds the noise threshold, the system automatically determines that the first segment includes noise 135, and an amount of compression is manually or automatically applied 138 to the amplitude of the audio data in the first segment of audio data occurring at the selected frequency band that corresponds to the identified noise.

Likewise, the system analyzes 140 a second segment of audio data to determine if the amplitude of the second segment of audio data at the frequency band (e.g., 840 Hz) exceeds the noise threshold. In some implementations, the system can analyze the second segment of audio data after the system completes an analysis of the first segment of audio data and regardless of whether noise was found in and compression applied to the first segment of audio data. An analysis of the second segment can include an analysis based on the same parameters used to analyze the first segment (e.g., amplitude, phase, frequency and time). If the system determines that a combination of parameters for the second segment exceeds the noise threshold, the system automatically determines that the second segment includes noise 145, and an amount of compression is manually or automatically applied 148 to the second segment of audio data occurring at the selected frequency band that corresponds to the identified noise in the second segment.

In some implementations, when the system determines that a subsequent (e.g., second) segment of audio data contains noise, the parameters of a compressor can be adapted to compress audio data corresponding to the amplitude of the identified noise in the subsequent segment, which can be different from the amplitude of the noise at which audio data was compressed in the preceding (e.g., first) segment. For example, if the identified noise in the first segment has an amplitude of −20 dB, the compression can be set to attenuate audio data having an amplitude of −20 dB or less. If the identified noise in the second segment has an amplitude of −15 dB, the compression can be adjusted to adapt to the new noise amplitude such that the compression attenuates audio data having an amplitude of −15 dB or less. Thus, the parameters of the compression can be adjusted according to the identified noise in each segment of the audio data.

In some implementations, the initial noise threshold is adjusted to a new threshold amount based on a determination of noise in the first segment. For example, if noise is determined to exist in the first segment at a threshold amount that is different from (e.g., greater or lesser than) the threshold amount originally set, the noise threshold can be reset or adjusted to the threshold amount of the first segment. Thus, the threshold amount for the first segment can become the threshold amount by which a subsequent segment of audio data is compared to determine if the subsequent segment of audio data contains noise. In this way, for example, the first segment can be used to determine whether the parameters of the second segment exceed the noise threshold.

In this way, the noise threshold is adaptive and is able to account for the changing levels of noise throughout audio data containing numerous segments. In some implementations, as each segment is found to exceed the noise threshold of the preceding segment, the noise threshold is reset to adapt to a new threshold (e.g., the higher threshold of the current segment) at which the audio data is considered likely to be noise.

In some implementations, the audio data is recorded and the existence of noise is determined based on an analysis of the audio data over time (e.g., an historical analysis which evaluates a designated amount of audio data over a specific time period). For example, an historic analysis of audio data can be performed using a numerical database, where the numbers in the database represent the occurrence of differing levels of amplitude data and phase data occurring over a set period of time and at a particular frequency. An historic analysis of audio data can also be performed using an example graph, like example graph 800 corresponding to an analysis of the frequency spectrum display of the audio data over a certain period of time.

An historical analysis can also be used to predetermine places in the audio data where the noise threshold will need to adapt to identify and possibly compress a new level of noise. Using an historic analysis of the audio data, the user or the system can predetermine places in the audio data where undesirable audio data exists. For example, a predetermination of noise at particular time periods in the audio data can allow the user or the system to change the noise level manually or automatically to conform to the changing amounts of noise throughout the audio data. In some implementations, the determination of noise can be learned (or anticipated) by the system based on prior occurrences of noise in the same or other audio segments. The system can then automatically adapt the noise threshold of the audio data according to the learned noise. In some implementations, the system can suggest a reset of the confidence level threshold to the user based on the learned noise, and the user can selectively choose to preset or reset the noise threshold at one or more points (e.g., for one or more segments) in the audio data.

Once the audio data for each frequency band (230, 240, and 250) is isolated and analyzed (130 and 140), desirable audio data (e.g., music, pure tones, and voice) is distinguishable from undesirable audio data (e.g., noise, whines and hums).

Figure 5:
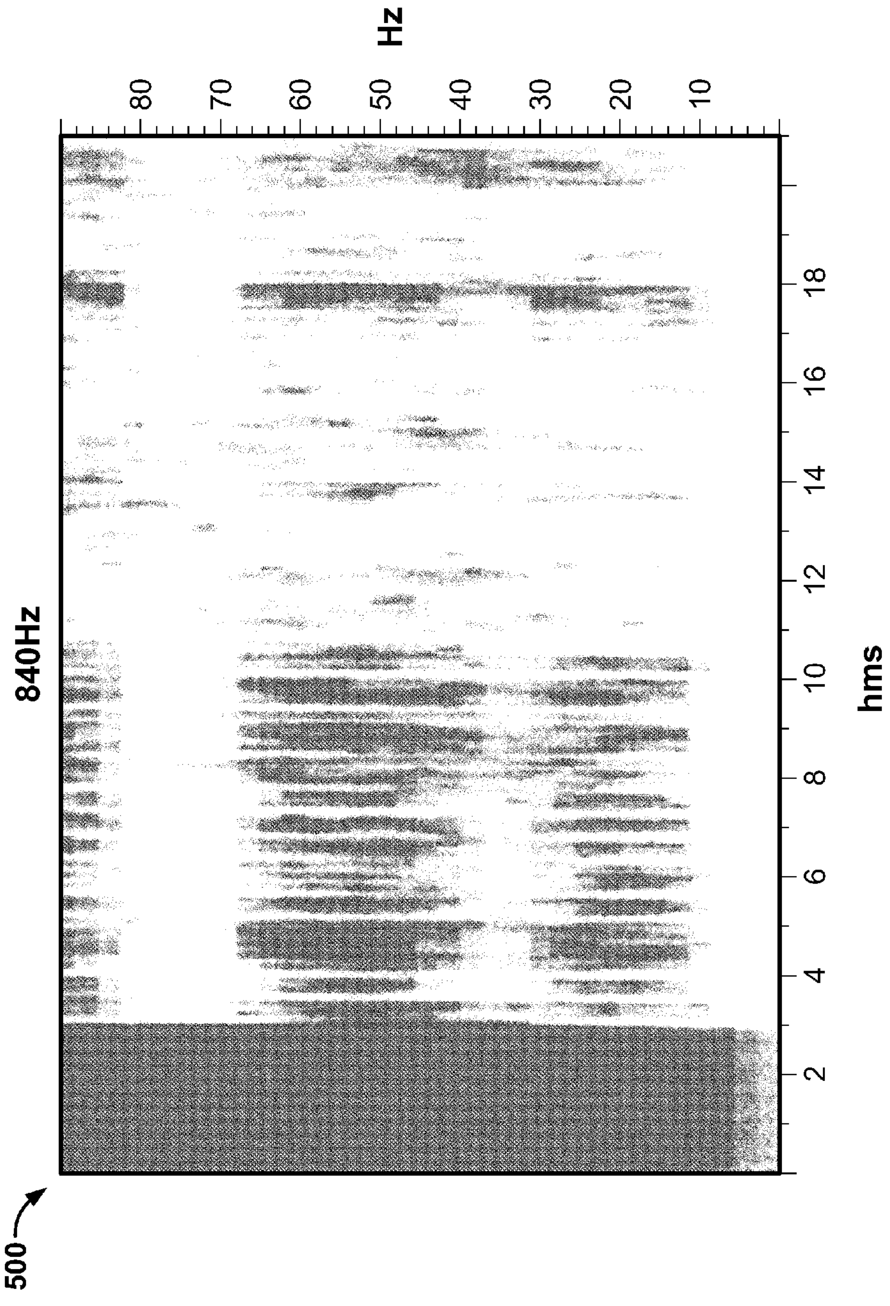
FIG. 5 shows an example display of an isolated 840 Hz frequency band audio data derived from the frequency spectrogram display in FIG. 2.

FIG. 5 shows an example display 500 of the isolated audio data at the 840 Hz frequency band derived from the frequency spectrogram 200 in FIG. 2. From an analysis of the FFT performed on the audio data for the frequency band 230 at 840 Hz, a determination can be made as to which portions of the amplitude data represent noise at 840 Hz. For example, the first three seconds of audio data from frequency band 230 at 840 Hz show a great deal of noise, or undesirable audio data. This is particularly evident when compared to the remaining audio data. For example, the audio data from 3.1 seconds to 21.00 seconds shows rapid changes signifying regular music, or desirable audio data.

Figure 6:
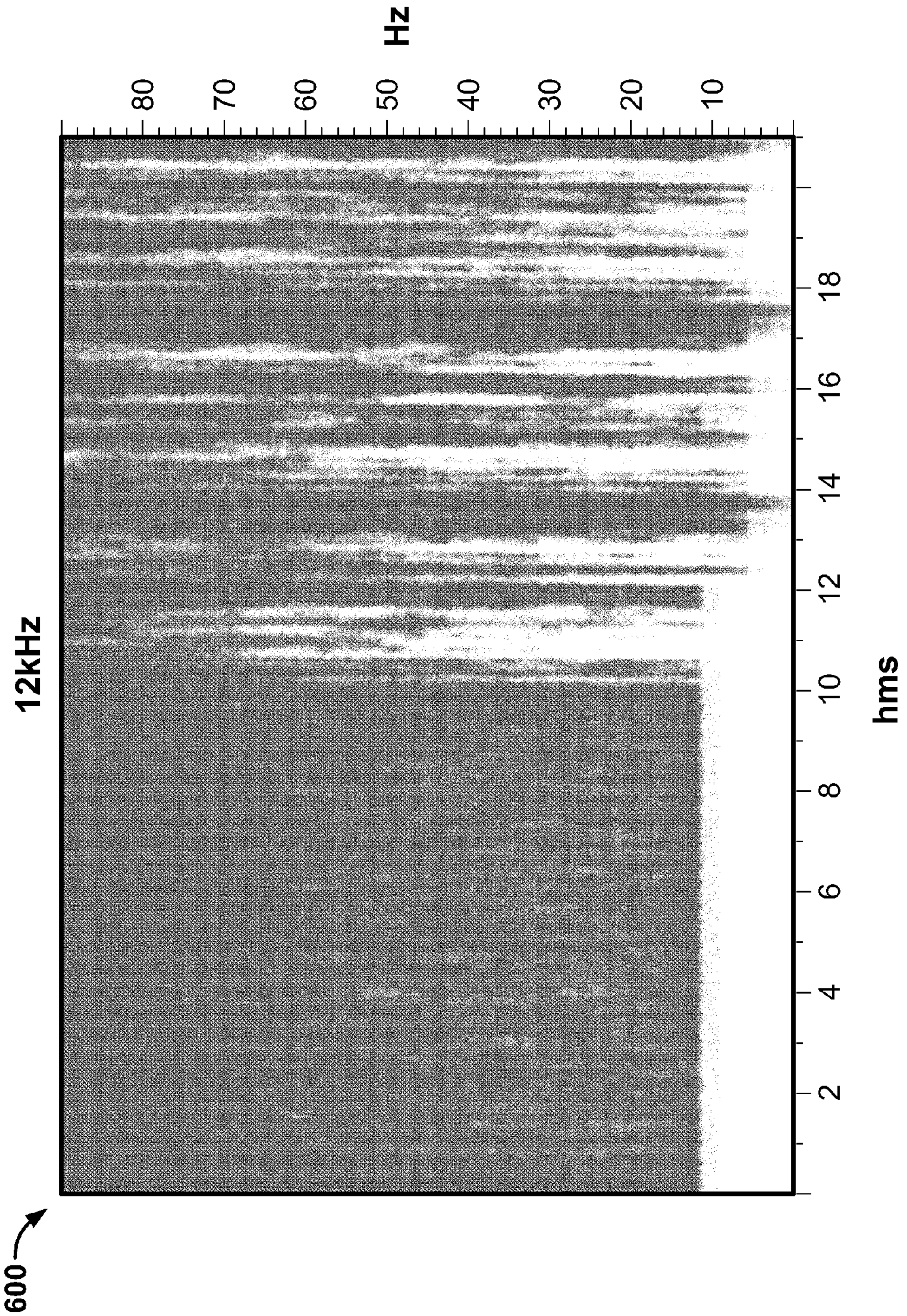
FIG. 6 shows an example display of an isolated 12 kHz frequency band audio data derived from the frequency spectrogram display in FIG. 2.

FIG. 6 shows an example display 600 of the isolated 12 kHz frequency band audio data derived from the frequency spectrogram display in FIG. 2. From an analysis of the FFT performed on the amplitude data for the frequency band 240 at 12 kHz, a determination can be made as to which portions of the amplitude data represent noise at 12 kHz. For example, a pure 12 kHz tone (e.g., possibly undesirable audio data) is seen at the bottom of the graph as a smooth horizontal line. The tone changes very little over time, even when it overlaps with music (desirable audio data) at about 11.0 seconds.

Figure 7:
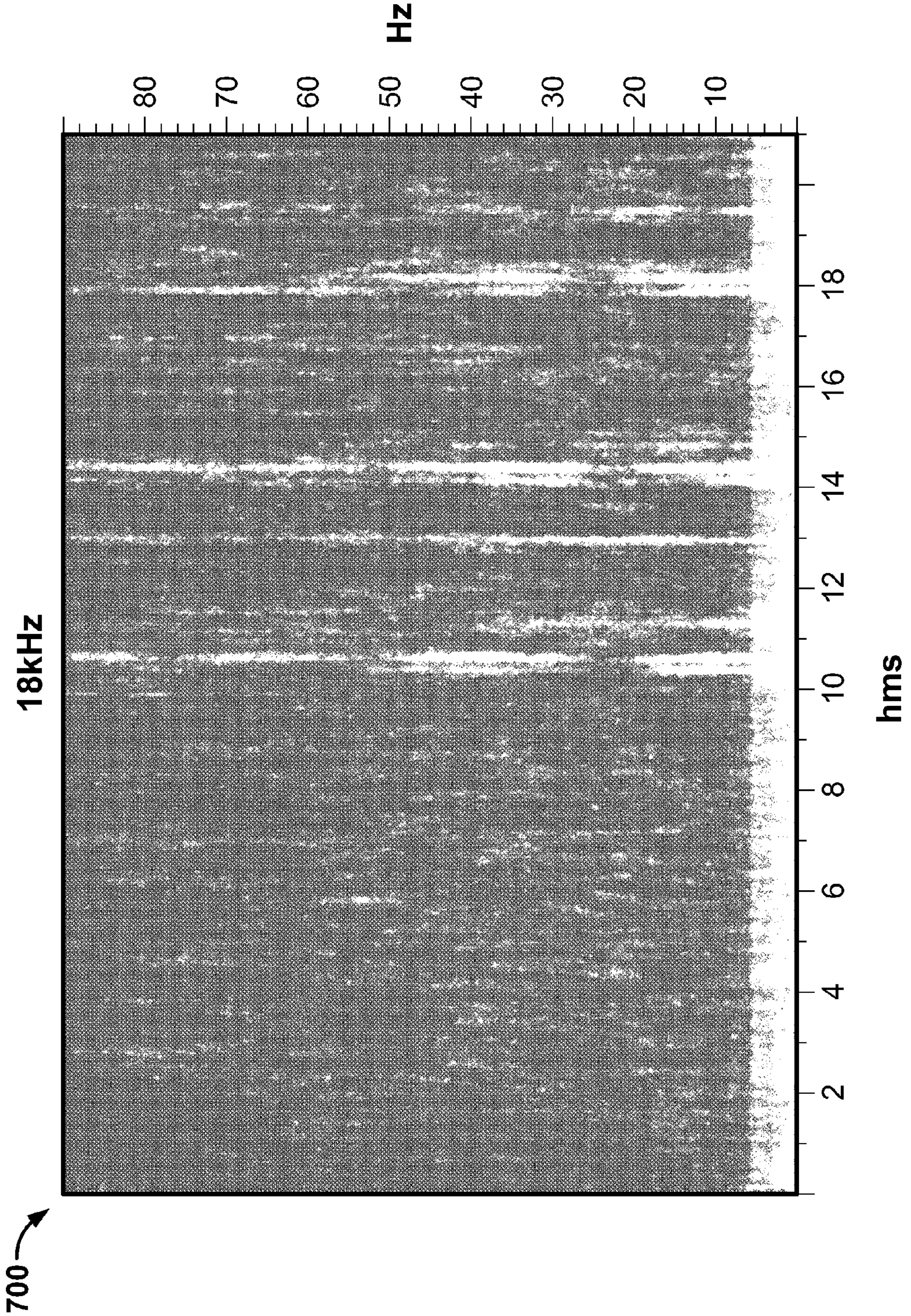
FIG. 7 shows an example display of an isolated 18 kHz frequency band audio data derived from the frequency spectrogram display in FIG. 2.

FIG. 7 shows an example display 700 of the isolated 18 kHz frequency band audio data derived from the frequency spectrogram display in FIG. 2. From an analysis of the FFT performed on the amplitude data for the frequency band 250 at 18 kHz, a determination can be made as to which portions of the amplitude data represent noise at 18 kHz. For example, the first 10.5 seconds of the 18 kHz frequency band show a great deal of background noise (undesirable audio data) followed by what appears to be additional noise and some intermittent musical activity (e.g., cymbal brush sounds or possibly desirable audio data) in the last 10.5 seconds.

FIG. 8 shows an example graph 800 corresponding to an analysis of the frequency spectrum display of the audio data in FIG. 2. The graph 800 represents the analysis done on the FFTs of the amplitude data from FIG. 2. The FFT images 500, 600 and 700 are converted to show a confidence level over time (e.g., a level of confidence that the audio is valid or desirable audio data that the user should keep). The y-axis 810 represents the confidence level scale and the x-axis 820 represents frames of audio data. For example, each frame of audio data represents 2048 samples from the frequency spectrogram 200 of the audio data 260 in a frequency-time domain. Thus, example graph 800 includes 452 frames representing the entire 21 seconds of audio data 260.

After a segment of audio data is determined to include noise, the noise can be manually or automatically removed or reduced. In some implementations, when the audio data is determined to contain noise, an amount of compression can be applied. For example, an amount of compression can be applied to all audio data in a particular frequency band for a specified period of time. The amount of compression that is applied to the audio data can be determined manually (e.g., by the user), automatically (e.g., by the system) or suggested to the user based on an analysis of the audio data (e.g., by the system). For example, a specified compression ratio can be used to attenuate the noise audio data by a particular amount.

Figure 9:
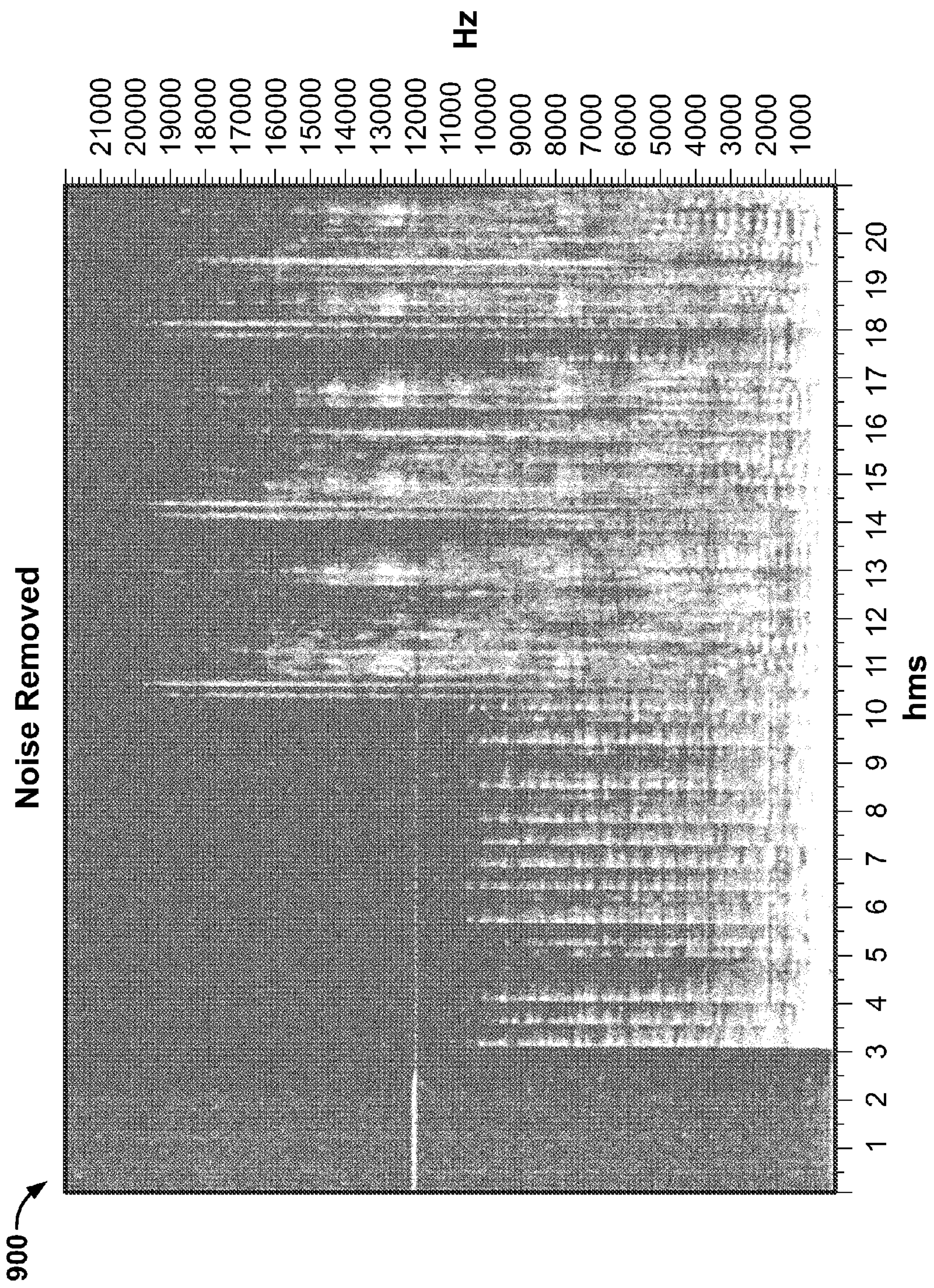
FIG. 9 shows an example frequency spectrum display of the audio data in FIG. 2 with the audio data determined to be noise removed.

FIG. 9 shows an example frequency spectrum display 900 of the audio data displayed in FIG. 2 with the audio data determined to be noise removed. The noise may be isolated and stored for additional analysis by the user or the system.

Alternatively, the subtraction of the portion of the audio data located at the selected region can be the desired effect (e.g., performing an edit to remove unwanted noise components of the audio data). Thus, the subtraction of the isolated audio data from the audio data provides the edited effect.

Figure 10:
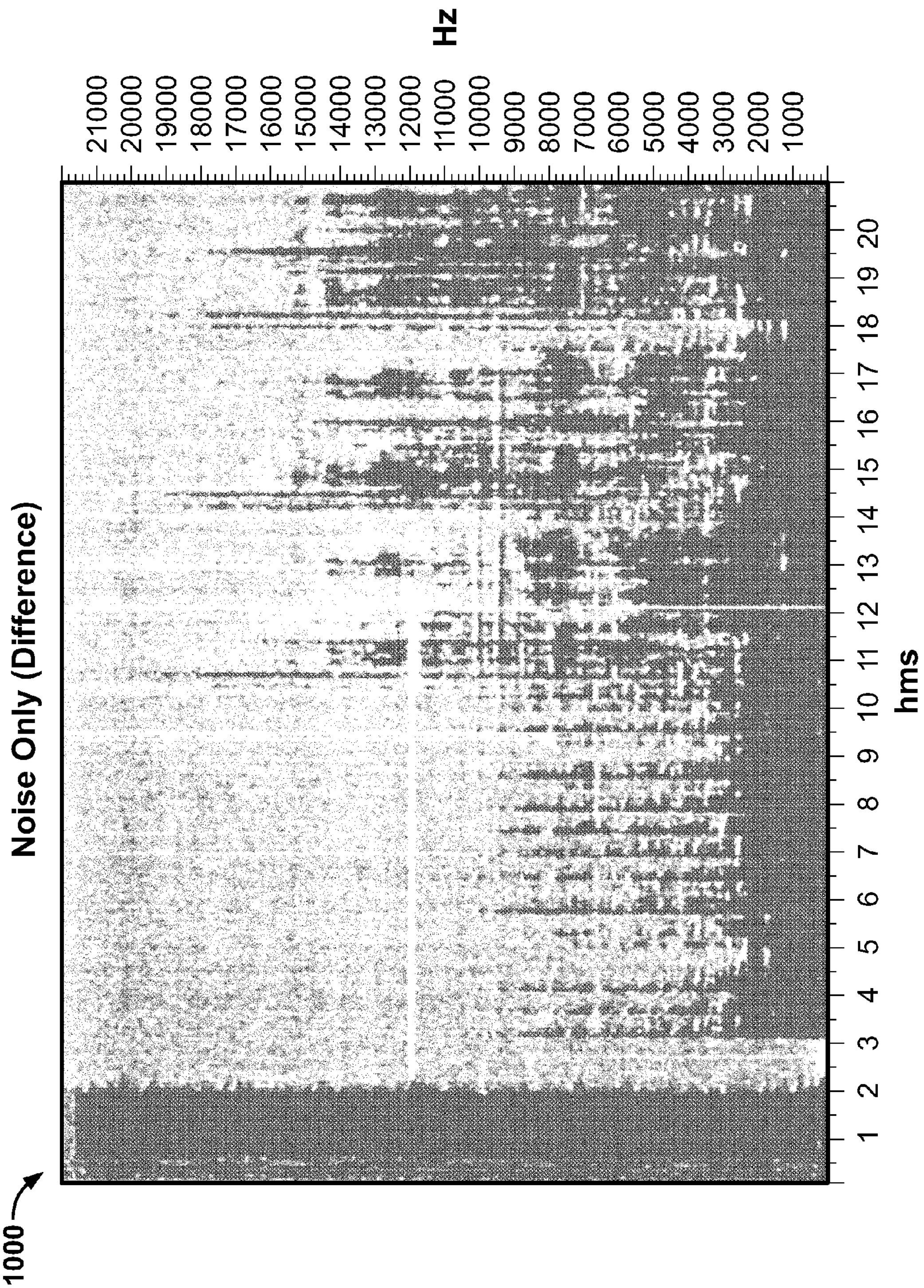
FIG. 10 shows an example display of isolated audio data determined to be noise as derived from FIG. 2.

FIG. 10 shows an example display 1000 of the isolated audio data determined to be noised as derived from FIG. 2. Once the user has completed editing operations, the edited audio file can be saved and stored for playback, transmission, or other uses.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. Additionally, in other implementations, the data is not audio data. Other data, which can be displayed as frequency over time, can also be used. For example, other data can be displayed in a frequency spectrogram including seismic, radio, microwave, ultrasound, light intensity, and meteorological (e.g., temperature, pressure, wind speed) data. Consequently, regions of the displayed data can be similarly edited as discussed above. Also, a display of audio data other than a frequency spectrogram can be used.

What is claimed is:

1. A computer-implemented method comprising:

receiving digital audio data;

receiving input specifying a noise threshold, the noise threshold identifying a level at which one or more segments of audio data are considered to be noise, the noise threshold specifying a noisiness factor derived from a plurality of parameters of the audio data including an amplitude value of the audio data and a corresponding duration of the audio data, the noise threshold being applied to each of a plurality of frequency bands of the audio data;

analyzing a first segment of the digital audio data at a first frequency band to identify noise, such that when audio data in the first segment exceeds the noise threshold, the first segment is identified as including a first noise and the audio data is compressed including:

determining a first amplitude of the audio data corresponding to the first noise, and attenuating audio data of the first frequency band of the first segment according to the first amplitude of the first noise; and analyzing a second segment of the digital audio data at the first frequency band to identify noise, such that when audio data in the second segment exceeds the noise threshold, the second segment is identified as including a second noise and the audio data is compressed including:

determining a second amplitude of the audio data corresponding to the second noise, and attenuating audio data of the first frequency band of the second segment according to second amplitude of the second noise, where the second amplitude is distinct from the first amplitude such that the compression is adapted to compress the second noise at the second amplitude.

2. The computer-implemented method of claim 1, where compressing the first noise further comprises determining a compression amount to be applied to the audio data corresponding to the first noise and adjusting a compression threshold to correspond to the amplitude of the first noise and where compressing the second noise further comprises adjusting the compression threshold to correspond to the amplitude of the second noise.

3. The computer-implemented method of claim 1, where the noise threshold indicates a confidence that particular audio data is noise, the noise threshold being a function of the parameters of the audio data in each segment.

4. The computer-implemented method of claim 1, where the one or more segments of digital audio data are overlapping in time.

5. The computer-implemented method of claim 1, where analyzing further includes recording and determining one or more patterns in the threshold history for the amount of time.

6. The computer-implemented method of claim 1, where the compression of the amplitude is automatic.

7. A computer program product, encoded on a non-transitory computer-readable medium, operable to cause a data processing apparatus to perform operations comprising:

receiving digital audio data;

receiving input specifying a noise threshold, the noise threshold identifying a level at which one or more segments of audio data are considered to be noise, the noise threshold specifying a noisiness factor derived from a plurality of parameters of the audio data including an amplitude value of the audio data and a corresponding duration of the audio data, the noise threshold being applied to each of a plurality of frequency bands of the audio data;

analyzing a first segment of the digital audio data at a first frequency band to identify noise, such that when audio data in the first segment exceeds the noise threshold, the first segment is identified as including a first noise and the audio data is compressed including:

determining a first amplitude of the audio data corresponding to the first noise, and attenuating audio data of the first frequency band of the first segment according to the first amplitude of the first noise;

analyzing a second segment of the digital audio data at the first frequency band to identify noise, such that when audio data in the second segment exceeds the noise threshold, the second segment is identified as including a second noise and the audio data is compressed including:

determining a second amplitude of the audio data corresponding to the second noise, and attenuating audio data of the first frequency band of the second segment according to second amplitude of the second noise, where the second amplitude is distinct from the first amplitude such that the compression is adapted to compress the second noise at the second amplitude.

8. The computer program product of claim 7, where compressing the first noise further comprises determining a compression amount to be applied to the audio data corresponding to the first noise and adjusting a compression threshold to correspond to the amplitude of the first noise and where compressing the second noise further comprises adjusting the compression threshold to correspond to the amplitude of the second noise.

9. The computer program product of claim 7, where the noise threshold indicates a confidence that particular audio data is noise, the noise threshold being a function of the parameters of the audio data in each segment.

10. The computer program product of claim 7, where the one or more segments of digital audio data are overlapping in time.

11. The computer program product of claim 7, where analyzing further includes recording and determining one or more patterns in the threshold history for the amount of time.

12. The computer program product of claim 7, where the compression of the amplitude is automatic.

13. A system comprising:

a user interface device;

one or more computers operable to interact with the user interface device to:

receive digital audio data;

receive input specifying a noise threshold, the noise threshold identifying a level at which one or more segments of audio data are considered to be noise, the noise threshold specifying a noisiness factor derived from a plurality of parameters of the audio data including an amplitude value of the audio data and a corresponding duration of the audio data, the noise threshold being applied to each of a plurality of frequency bands of the audio data;

analyze a first segment of the digital audio data at a first frequency band to identify noise, such that when audio data in the first segment exceeds the noise threshold, the first segment is identified as including a first noise and the audio data is compressed including:

determining a first amplitude of the audio data corresponding to the first noise, and attenuating audio data of the first frequency band of the first segment according to the first amplitude of the first noise;

analyze a second segment of the digital audio data at the first frequency band to identify noise, such that when audio data in the second segment exceeds the noise threshold, the second segment is identified as including a second noise and the audio data is compressed including:

determining a second amplitude of the audio data corresponding to the second noise, and attenuating audio data of the first frequency band of the second segment according to second amplitude of the second noise, where the second amplitude is distinct from the first amplitude such that the compression is adapted to compress the second noise at the second amplitude.

14. The system of claim 13, where compressing the first noise further comprises determining a compression amount to be applied to the audio data corresponding to the first noise and adjusting a compression threshold to correspond to the amplitude of the first noise and where compressing the second noise further comprises adjusting the compression threshold to correspond to the amplitude of the second noise.

15. The system of claim 13, where the noise threshold indicates a confidence that particular audio data is noise, the noise threshold being a function of the parameters of the audio data in each segment.

16. The system of claim 13, where the one or more segments of digital audio data are overlapping in time.

17. The system of claim 13, where analyzing further includes recording and determining one or more patterns in the threshold history for the amount of time.

18. The system of claim 13, where the compression of the amplitude is automatic.

19. The method of claim 1, where the noise threshold for the second segment is adjusted based on the first noise.

20. The computer program product of claim 7, where the noise threshold for the second segment is adjusted based on the first noise.

21. The system of claim 13, where the noise threshold for the second segment is adjusted based on the first noise.

* * * * *